(12) United States Patent
Zhang

(10) Patent No.: US 8,952,833 B2
(45) Date of Patent: Feb. 10, 2015

(54) RECEIVING APPARATUS AND ELECTRONIC DEVICE EMPLOYING THE RECEIVING APPARATUS

(71) Applicants: Fu Tai Hua Industry (Shenzhen) Co., Ltd., Shenzhen (CN); Hon Hai Precision Industry Co., Ltd., New Taipei (TW)

(72) Inventor: Jun-Liang Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 170 days.

(21) Appl. No.: 13/689,726

(22) Filed: Nov. 29, 2012

(65) Prior Publication Data

US 2013/0154856 A1 Jun. 20, 2013

(30) Foreign Application Priority Data

Dec. 20, 2011 (CN) .......................... 2011 1 0428783

(51) Int. Cl.
| | |
|---|---|
| *H03K 17/94* | (2006.01) |
| *G06F 3/01* | (2006.01) |
| *G06F 1/16* | (2006.01) |
| *G06F 3/02* | (2006.01) |

(52) U.S. Cl.
CPC ................ *G06F 3/01* (2013.01); *G06F 1/1601* (2013.01); *G06F 1/1656* (2013.01); *G06F 3/021* (2013.01)

USPC .............................. 341/22; 341/20; 345/168

(58) Field of Classification Search
USPC ........ 341/20, 21, 22, 140, 173; 345/156, 163, 345/168, 169, 173; 361/679.01, 679.08, 361/679.11; 400/703, 172; 379/368; 708/142; 340/407.2
See application file for complete search history.

(56) References Cited

U.S. PATENT DOCUMENTS

| 6,262,716 B1 * | 7/2001 | Raasch ........................ 345/168 |
| 6,373,471 B1 * | 4/2002 | Lin ............................. 345/168 |
| 6,630,895 B1 * | 10/2003 | Dong ............................. 341/22 |
| 2004/0066611 A1 * | 4/2004 | Wu ............................... 361/680 |

\* cited by examiner

*Primary Examiner* — Anh V La
(74) *Attorney, Agent, or Firm* — Novak Druce Connolly Bove + Quigg LLP

(57) ABSTRACT

A receiving apparatus includes a casing; a lid is rotatably engaged in one side of the casing to open and close the casing. The receiving apparatus further comprises a supporting portion and a transmission mechanism. The supporting portion is engaged in the bottom of the casing for receiving an input and output interface. The transmission mechanism rotates the supporting portion to be in between vertical and horizontal relative to the casing by cooperation with the lid; wherein when the receiving apparatus is in a closed state, the supporting portion is inclined to the bottom of the casing; and when the casing is in an open state, the supporting portion is perpendicular to the bottom of the casing. An electronic device employing the receiving apparatus is provided.

17 Claims, 4 Drawing Sheets

RECEIVING APPARATUS AND ELECTRONIC DEVICE EMPLOYING THE RECEIVING APPARATUS

BACKGROUND

1. Technical Field

The present disclosure relates to receiving apparatus, and particularly to a receiving apparatus employed by an electronic device such as a keyboard.

2. Description of Related Art

Input and output interfaces, such as a USB interface and a HDMI interface, are found in electronic devices, such as computers and displays. The electronic devices define openings in their enclosures, so as to expose the input and output interfaces. Input and output interfaces which are exposed in this way are vulnerable to damage by external shocks.

Therefore, an electronic device employing a receiving apparatus to overcome the above described shortcoming is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
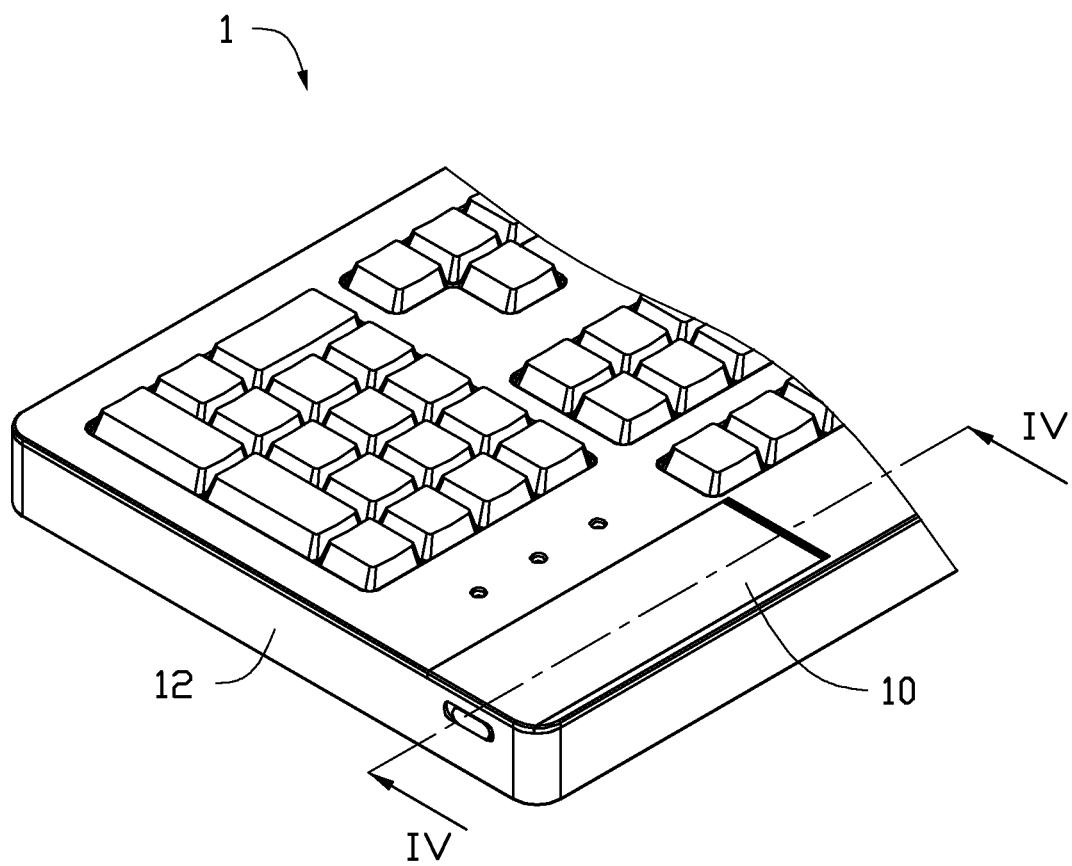
FIG. 1 is an isometric view of a receiving apparatus, according to one embodiment, in a closed state.
Figure 2:
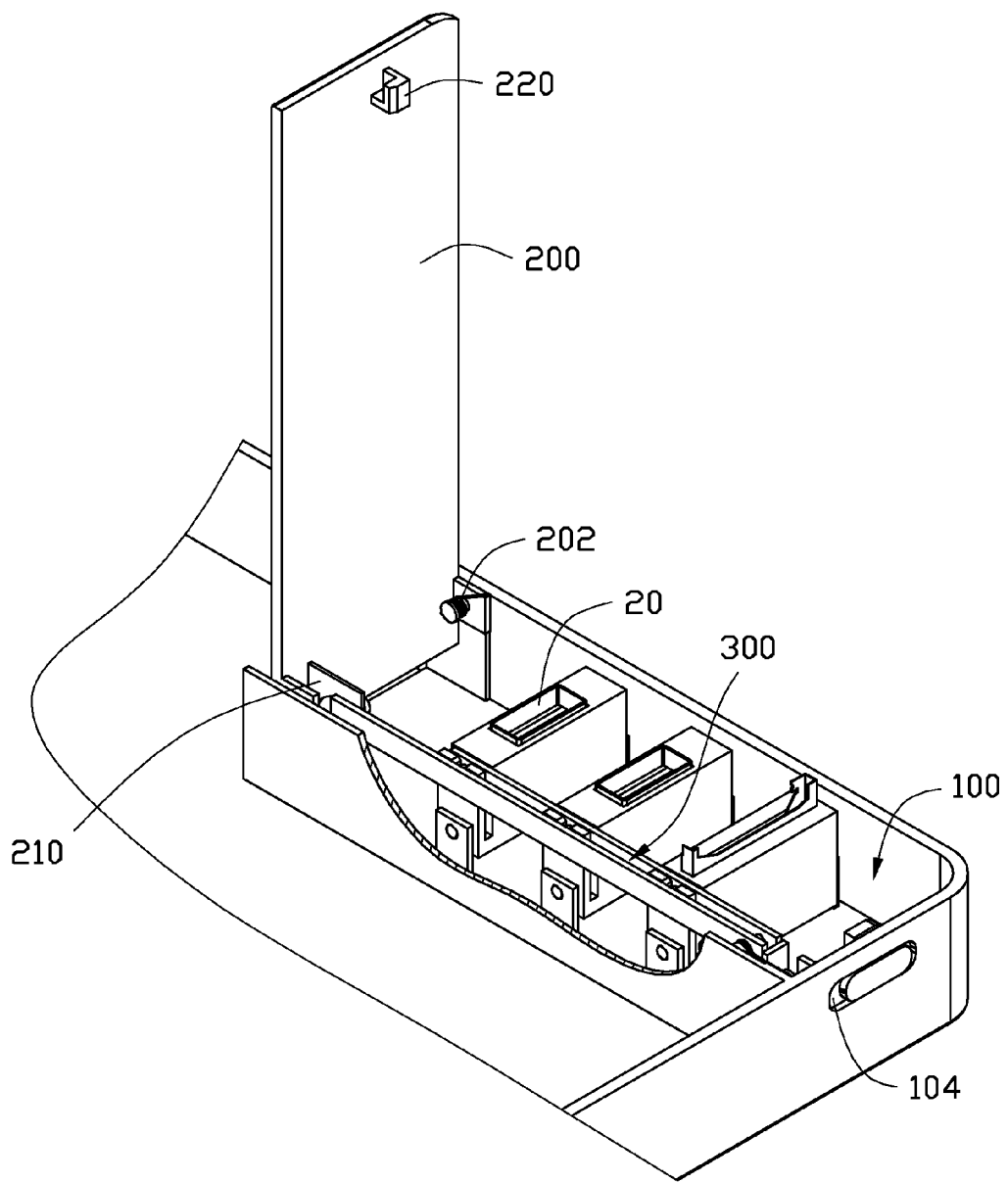
FIG. 2 is an isometric view of the receiving apparatus of FIG. 1, in an open state.

Referring to FIG. 1 and FIG. 2, a receiving apparatus 10 is arranged in an electronic device, for example, a keyboard, a display, a computer, or the like. The electronic device 1 includes a housing 12. The receiving apparatus 10 is mounted in the housing 12. The receiving apparatus 10 includes a casing 100, a lid 200, a transmission mechanism 300, a plurality of supporting portions 400 (see FIG. 3) and a locking mechanism 500. Each supporting portion 400 defines a receiving space for receiving an input and output interface 20. The supporting portions 400 are received in the casing 100 via the transmission mechanism 300. The lid 200 rotatably connects with one side of the casing 100, and covers the supporting portions 400 or exposes the supporting portions 400. The locking mechanism 500 locks the lid 200 down on the casing 100 when the lid 200 completely covers the casing 100. In one embodiment, the receiving apparatus 10 includes three supporting portions 400.

The input and output interface 20 may be a USB interface, a HDMI interface or any other interface. The size of the receiving space matches the size and number of the input and output interfaces 20 received therein. The open casing 100 may be rectangular. A size of the lid 200 matches with the opening of the casing 100. The transmission mechanism 300 is mounted in the casing 100 and connected with the lid 200 and the supporting portions 400. The transmission mechanism 300 drives the supporting portions 400 to rotate relative to the casing 100 when the lid 200 is lifted up or closed. When the receiving apparatus 10 is in a closed state, the supporting portions 400 are in an inclined state (between perpendicular and horizontal) relative to the casing 100; when the receiving apparatus 10 is in an open state, the supporting portions 400 are vertical and upright within the casing 100.

Figure 3:
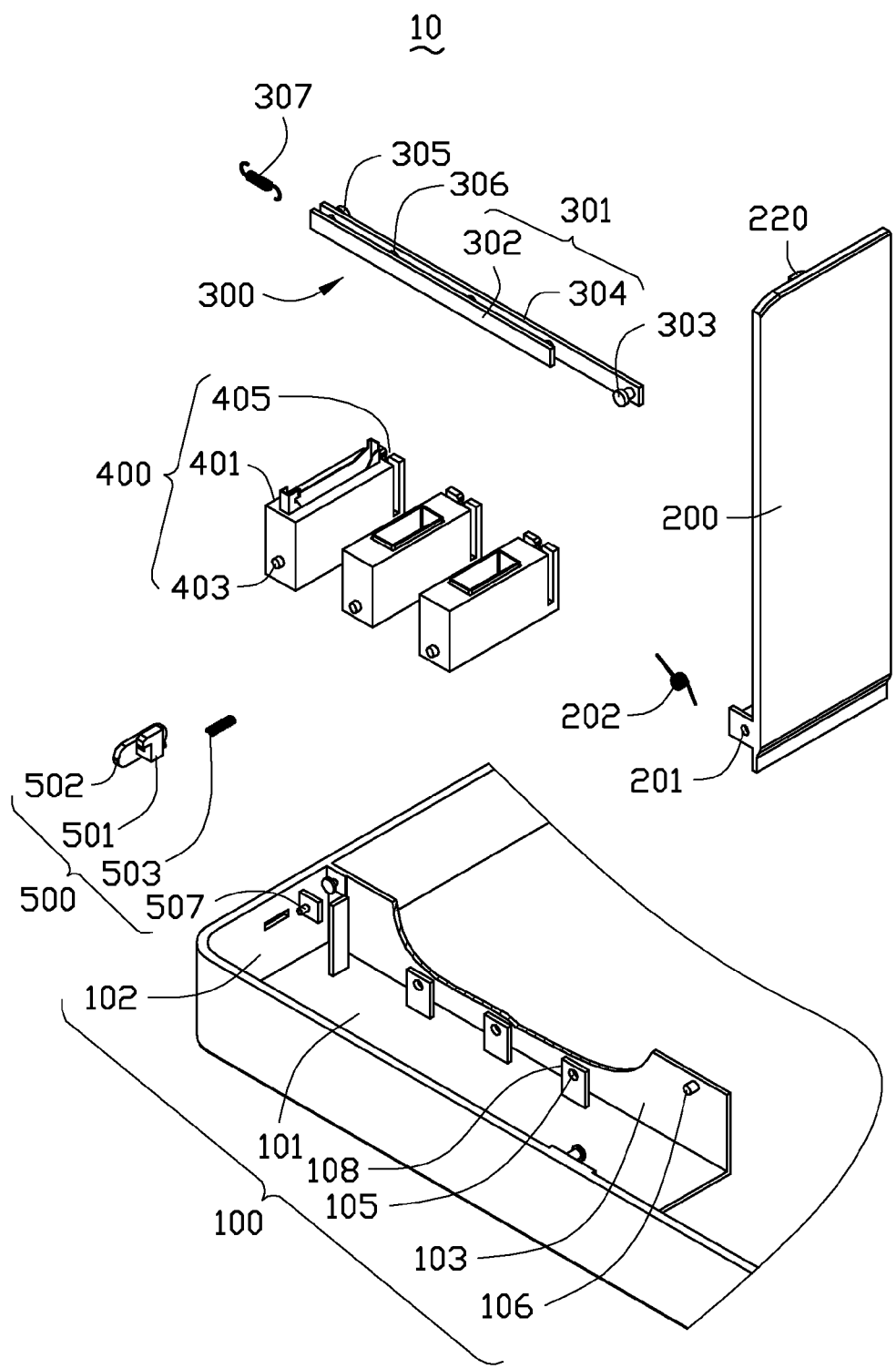
FIG. 3 is an exploded view of the receiving apparatus of FIG. 1.
Figure 4:
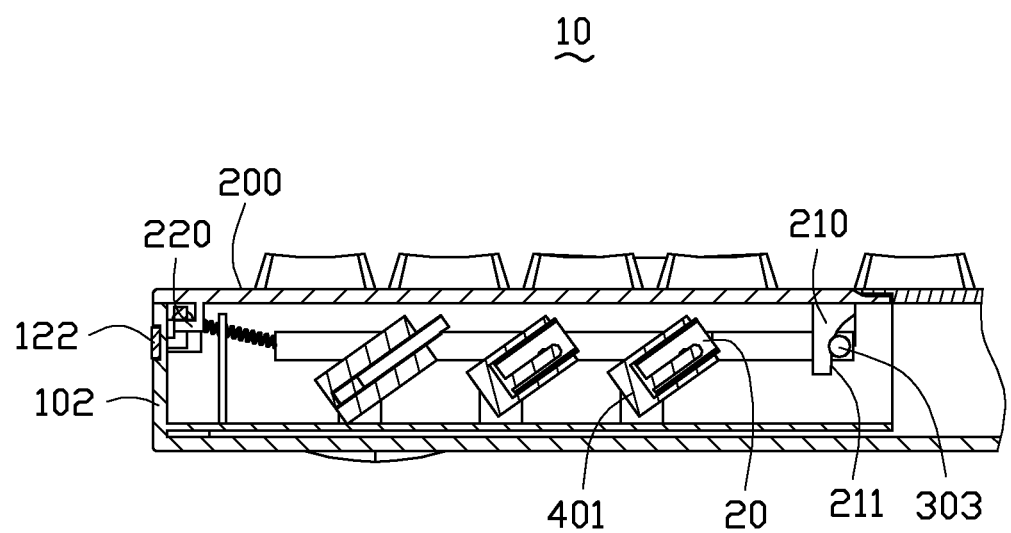
FIG. 4 is a sectional view of FIG. 1 along line IV-IV.

Referring also to FIGS. 3 and 4, the casing 100 defines a bottom wall 101, a first sidewall 102 and two second sidewalls 103. The two second sidewalls 103 extend from opposite sides of the bottom wall 101. The first sidewall 102 connects with one end of each second sidewall 103, and the bottom wall 101.

The casing 100 further includes three fixing plates 108 perpendicular to the bottom wall 101 and corresponding to the three supporting portions 400. Each fixing plate 108 defines a first fixing hole 105 for fixing a supporting portion 400. The casing 100 further includes two internal first pivots 106 at the end of each second sidewall 103 farthest from the first sidewall 102. The two first pivots 106 rotatably engage with the lid 200.

The lid 200 defines two second fixing holes 201 at one end. The lid 200 is connected to the casing 100 by the two first pivots 106 received in the second fixing holes 201. A torsion spring 202 is connected with the casing 100 and the lid 200 to drive the lid 200 to open when the locking mechanism 500 is unlocked. The lid 200 includes a resisting portion 210 extending from an inside surface of the lid 200. The resisting portion 210 defines a concave surface portion 211 at a bottom thereof. The lid 200 further includes a latching member 220 which is farthest away from the resisting portion 210. The resisting portion 210 engages with the transmission mechanism 300 and drives the transmission mechanism 300 to move when the lid 200 is opened or closed. The torsion spring 202 is secured in the first pivot 106 of the second sidewall 103. The latching member 220 latches the lid 200 by cooperation with the locking mechanism 500.

The transmission mechanism 300 includes a linkage mechanism 301, a protrusion 303, a fixing portion 305 and a second elastic member 307. The linkage mechanism 301 includes a first connecting bar 302 and a second connecting bar 304. The first connecting bar 302 connects to the second connecting bar 304 via a plurality of connecting portions 306. The protrusion 303 is arranged at one end of the second connecting bar 304, the fixing portion 305 is arranged at another end of the second connecting bar 304. The protrusion 303 and the fixing portion 305 face different second sidewalls 103. The fixing portion 305 connects to the second sidewall 103 via the second elastic member 307. The protrusion 303 resists the concave surface portion 211 of the resisting portion 210. Each connecting portion 306 corresponds to a supporting portion 400.

Each supporting portion 400 includes a main body 401, a second pivot 403 and a latching groove 405. The main body 401 defines the receiving space 410 for arranging an input and output interface 20. The second pivot 403 and the latching groove 405 are located at opposite sidewalls of the main body 401. The second pivot 403 is arranged to correspond to the first fixing hole 105 of the second sidewall 103. The latching groove 405 receives the first connecting bar 302 and one connecting portion 306.

The locking mechanism 500 is arranged in the first sidewall 102. The first sidewall 102 defines a through hole 104. The locking mechanism 500 includes a catching protrusion 501, a button 502 and a first elastic member 503. The button 502 extends out of the first sidewall 102 via the through hole 104. The catching protrusion 501 extends along the first sidewall 102 away from the button 502. The locking mechanism 500 further includes a fixing portion 507 formed between the through hole 104 and the second sidewall 103. The fixing portion 507 may be a protrusion extending from an inner surface of the first sidewall 102. The locking mechanism 500 holds down the lid 200 when the casing 100 in the closed state. The first elastic member 503 connects with the catching protrusion 501 and the fixing portion 507. The button 502 can slide in the through hole 104 to compress the first elastic member 503.

When the receiving apparatus 10 is in the closed state as shown in FIG. 4, the lid 200 covers the casing 100. Each supporting portion 400 is in a vertical orientation relative to the bottom wall 101. The second elastic member 307 and the torsion spring 202 are compressed and deformed.

When the input and output interface 20 is needed, the button 502 is slid in the through hole 104, the locking mechanism 500 disengages from the latching member 220, the lid 200 rotates on the two first pivots 106 to open the casing 100, by the force of the torsion spring 202. As the lid 200 rotates up, the second elastic member 307 pulls the linkage mechanism 301 towards the first sidewall 102. The connecting portion 306 moves the supporting portions 400 to stand perpendicular to the bottom wall 101. The receiving apparatus 10 is in the open state.

Referring also to FIG. 4, this shows the receiving apparatus 10 in the closed state. The lid 200 covers the casing 100. Each supporting portion 400 is inclined relative to the bottom wall 101. The second elastic member 307 and the torsion spring 202 are compressed again to store energy.

When the input and output interface 20 is no longer needed, the user presses the lid 200 down to cover the casing 100, the receiving apparatus 10 reverts to the closed state.

The receiving apparatus 10 arranges a casing to receive an input and output interface 20, the lid 200 can open and close the casing 100. When the input and output interface 20 is not required, the receiving apparatus 10 is in a closed state, providing complete protection for the input and output interfaces against damage.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. A receiving apparatus for receiving an input and output interface, the receiving apparatus comprising:
   a casing;
   a lid rotatably engaged in one side of the casing to open and close the casing;
   a supporting portion received in the casing, the supporting portion defining a receiving space for accommodating the input and output interface; and
   a transmission mechanism connecting with the lid and the supporting portion and configured for driving the supporting portion to rotate relative to the casing by cooperation with the lid;
   wherein when the receiving apparatus is in a closed state, the lid covers the casing and the supporting portion is completely received in the casing and inclined to a bottom of the casing; when the receiving apparatus switches to an open state from the closed state, the lid rotates to open the casing and the supporting portion rotates relative to the bottom of the casing to be perpendicular to the bottom of the casing.

2. The receiving apparatus of claim 1, wherein the receiving apparatus comprises a locking mechanism for locking the lid on the casing when the receiving apparatus is located in the closed state.

3. The receiving apparatus of claim 2, wherein the lid comprises a latching mechanism, when the receiving apparatus is in the closed state, the latching mechanism latches the lid by cooperation with the locking mechanism.

4. The receiving apparatus of claim 3, wherein the transmission mechanism comprises a protrusion and a linkage mechanism, the protrusion is arranged in one side of the linkage mechanism near the lid, the linkage mechanism drives the supporting portion to rotate relative to the casing when the lid rotates.

5. The receiving apparatus of claim 4, wherein the lid arranges a resisting portion at one side of the lid connected to the casing, the resisting portion defines a concave surface; the protrusion of the transmission mechanism resists the concave surface; when the lid rotates relative to the casing, the resisting portion drives the linkage mechanism to move.

6. The receiving apparatus of claim 5, wherein the supporting portion defines a latching groove, the latching groove receives the linkage mechanism, the linkage mechanism drives the supporting portion to rotate relative to the bottom wall of the casing.

7. The receiving apparatus of claim 6, wherein the casing comprises a first sidewall; the first sidewall defines a through hole for receiving a button of the locking mechanism, the button slides in the through hole.

8. The receiving apparatus of claim 7, wherein when the button slides in the through hole, the latching mechanism moves away from the locking mechanism, the lid opens by a force of a torsion spring secured in one side connected to the casing.

9. An electronic device, comprising:
   a housing; and
   a receiving apparatus mounted in the housing, the receiving apparatus defining two states and switchable between the two states; comprising:
   a casing;
   a lid rotatably engaged in one side of the casing to open and close the casing; and
   the receiving apparatus further comprising a supporting portion and a transmission mechanism; the supporting portion engaged with a bottom of the casing for receiving an input and output interface;
   the transmission mechanism driving the supporting portion to rotate relative to the bottom of the casing by cooperation with the lid;
   wherein when the receiving apparatus is in a closed state of the two states, the lid covers the casing and the supporting portion is inclined relative to the bottom of the casing; when the receiving apparatus switches to an open state from the closed state, the lid rotates to open the casing and the supporting portion rotates relative to the bottom of the casing to be perpendicular to the bottom of the casing.

10. The electronic device of claim 9, wherein the casing is a groove defined in the housing, and the lid covers the groove completely.

11. The electronic device of claim 9, wherein the receiving apparatus comprises a locking mechanism for locking the lid on the casing when the receiving apparatus is located in the closed state.

12. The electronic device of claim 11, wherein the lid comprises a latching mechanism, when the receiving apparatus is in the closed state, the latching mechanism latches the lid by cooperation with the locking mechanism.

13. The electronic device of claim 12, wherein the transmission mechanism comprises a protrusion and a linkage mechanism, the protrusion is arranged in one side of the linkage mechanism near the lid, the linkage mechanism drives the supporting portion to rotate relative to the casing when the lid rotates.

14. The electronic device of claim 13, wherein the lid arranges a resisting portion in one side of the lid connected to the casing, the resisting portion defines a concave surface; the protrusion of the transmission mechanism resists the concave surface of the lid; when the lid rotates relative to the casing, the resisting portion drives the linkage mechanism to move.

15. The electronic device of claim 14, wherein the supporting portion defines a latching groove, the latching groove receives the linkage mechanism, the linkage mechanism drives the supporting portion to rotate relative to the bottom wall of the casing.

16. The electronic device of claim 15, wherein the casing comprises a first sidewall; the first sidewall defines a through hole for receiving a button of the locking mechanism, the button slides in the through hole.

17. The electronic device of claim 16, wherein when the button slides in the through hole, the latching mechanism moves away from the locking mechanism, the lid opens the casing by a torsion spring secured in one side connected to the casing.

* * * * *